Patented Apr. 8, 1952

2,592,175

UNITED STATES PATENT OFFICE 2,592,175

MIXED THIO, OXY SILANES

Bernard A. Orkin, Philadelphia, Pa., assignor to Socony-Vacuum Oil Company, Incorporated, a corporation of New York No Drawing. Application August 4, 1948,
Serial No. 42,535

18 Claims. (Cl. 260—448.8)

This invention relates, broadly, to new compositions of matter and, more particularly, the present invention is concerned with silicate esters and with a process for producing the same.

The silicate esters contemplated herein are organic compounds having the formula $$(RO)_nSi(SR')_{4-n}$$

wherein $n$ is an integer varying between one and three, R is an aliphatic, cycloaliphatic, or an aryl radical, and R' is an aliphatic, a cylcoaliphatic or an aryl radical.

As is well known to those familiar with the art, several processes have been proposed for the preparation of esters of orthosilicic acid and of orthotetrathiosilicic acid. For example, tetraalkyl orthosilicates have been prepared by reacting four moles of an alcohol with one mole of silicon tetrachloride. The esters of orthotetrathiosilicic acid have been prepared from the reaction of sodium mercaptides with silicon tetrachloride. Both of the aforementioned types of esters, however, can be readily distilled to obtain the esters in relatively pure form. Conversely, the esters contemplated herein cannot be purified by conventional methods, such as distillation, and consequently, they are difficult to prepare in relatively pure form. In fact, in so far as is now known, these esters have never been described in the literature.

In accordance with the present invention, it has now been discovered that esters having the formula $(RO)_nSi(SR')_{4-n}$, wherein $n$, R and R' are as described hereinbefore, having a reasonably high degree of purity, can be prepared in good yields.

It has now been found that the aforementioned esters can be prepared by reacting a thiol, as set forth hereinafter, with a compound having the formula $(RO)_nSiX_{4-n}$, wherein $n$ is an integer varying between one and three; R is an aliphatic, a cycloaliphatic, or an aryl radical; and X is a halogen.

Accordingly, it is an object of the present invention to provide new compositions of matter. Another object is to provide a process for producing them. A further object is to provide new silicate esters. A more specific object is to afford new compounds having the formula $$(RO)_nSi(SR')_{4-n}$$

wherein $n$, R, and R' are as described hereinbefore. An important object is to provide a process whereby these compounds are produced in relatively pure form and in good yields. Other objects and advantages of the present invention will become obvious to those skilled in the art from the following detailed description.

Broadly stated, the present invention provides new organic compounds having the formula: $(RO)_nSi(SR')_{4-n}$, wherein $n$ is an integer varying between one and three; R is an aliphatic, a cycloaliphatic, or an aryl radical, and R' is an aliphatic, a cycloaliphatic, or an aryl radical; and a process for producing the same, which comprises reacting a thiol with a compound having the formula $(RO)_nSiX_{4-n}$, wherein R is an aliphatic, a cycloaliphatic, or an aryl radical; $n$ is an integer varying between one and three; and X is a halogen.

The compounds having the formula $$(RO)_nSiX_{4-n}$$

which are used to prepare the esters of the present invention, are well known to those skilled in the art and are obtained by reacting a silicon tetrahalide with an alcohol or phenol, followed by careful fractional distillation of the reaction product. The reaction yields a mixture of compounds in accordance with the following equation:

$$ROH + SiX_4 \rightarrow ROSiX_3 + (RO)_2SiX_2 + (RO)_3SiX + (RO)_4Si$$

The following examples are typical and demonstrate the preparation of such reaction mixtures and the subsequent fractionation.

EXAMPLE I

Dodecoxy-trichlorosilane

To 170 grams of silicon tetrachloride in 200 cubic centimeters of benzene, there were added dropwise, with stirring, 93 grams of 1-dodecanol. After the addition was complete, the reaction mixture was refluxed with stirring for 4½ hours. The benzene was topped off at normal pressure, and the product was distilled at 125° C. under two millimeters pressure. There were thus obtained 83 grams of a colorless, mobile liquid.

The residue, presumably the mixture of the di(dodecoxy)- and tri(dodecoxy)-chlorosilanes, weighed 50 grams.

EXAMPLE II

To 170 grams of silicon tetrachloride in 100 cubic centimeters of benzene, there was added, dropwise, a solution of 120 grams of phenol in 100 cubic centimeters of benzene. After the addition was complete, the mixture was heated at reflux temperature (about 80° C.) for about five hours. The solvent was removed by distillation, and two fractions were obtained from the remaining product, as set forth in Table I.

TABLE I

| Fraction | Weight, g. | Boiling Range, °C. | Pressure, mm. | Per Cent Cl |
|---|---|---|---|---|
| A | 29 | 105–120 | 45 | [1] 43.93 |
| B | 80 | 155–170 | 15 | [2] 24.48 |

[1] Per cent Cl in $C_6H_5OSiCl_3$ = 46.5%.
[2] Per cent Cl in $(C_6H_5O)_2SiCl_2$ = 24.9%.

From the foregoing data, it will be evident that good yields of mono- and di-phenoxy chlorosilanes are obtained by the process described hereinbefore.

It is within the concept of the present invention to use the reaction mixtures of compounds obtained by reacting an alcohol or a phenol with silicon tetrahalide without subsequent fractionation. Obviously, products made from such a mixture will not be pure compounds, but will constitute valuable synthetic lubricants having a desirable combination of properties.

The thiol reactants include the alkanthiols, the cycloalkanthiols, and the thiophenols. Non-limiting examples of the thiol reactant are ethanthiol, n-butanthiol, t-butanthiol, n-octanthiol, cyclohexanthiol, thiophenol, thiocresols, and benzyl mercaptan. The thiols may be prepared in many different ways, as is well known to those skilled in the art, and many are available commercially.

In the reaction of the present invention, an excess of thiol reactant over that required to react with all the halogen atoms of the reactant having the formula $(RO)_nSiX_{4-n}$ must be used. In practice, as many as four moles of thiol reactant for each atom of halogen in the reactant having the formula $(RO)_nSiX_{4-n}$ is ordinarily used. In general, the mole ratio of thiol reactant to the compound having the formula $$(RO)_nSiX_{4-n}$$

may vary between about two to one and about twelve to one, respectively.

For practical reasons, it is preferable to carry out the reaction in a non-polar hydrocarbon solvent. Especially preferred are the aromatic hydrocarbon solvents, such as, for example, benzene, toluene, and xylene. The amount of solvent to be used will vary between about 25 per cent and about 90 per cent by weight, based on the total weight of the reactants.

The temperature of the reaction is not too critical a factor. In general, the temperature will be the reflux temperature of the solvent used and, preferably, it varies between about 80° C. and about 140° C.

The time of reaction will depend on the temperature employed. In practice, the reaction is complete after heating the reactants at the preferred temperatures for a period of time varying between about 2 hours and about 5 hours, after all reactants have been added.

The reaction between the thio reactant and the reactant having the formula $(RO)_nSiX_{4-n}$ may be carried out by either of two methods, with equal effectiveness. In the first method, the thiol reactant, in solution in a hydrocarbon solvent, is reacted with sodium to form a suspension of the sodium salt. This salt is then reacted with the $(RO)_nSiX_{4-n}$ reactant and the NaX, thus formed, is filtered off. In the second method, the thiol reactant is reacted with the reactant having the formula $(RO)_nSiX_{4-n}$ in the presence of an amine, such as a trialkylamine. The amine combines with the hydrogen halide evolved during the reaction to form an insoluble amine hydrohalide which is subsequently removed by conventional methods of separation, such as filtration and decantation. Amines utilizable for this purpose are the trialkyl amines having between one and three carbon atoms per alkyl radical. Non-limiting examples are triethylamine and tripropylamine. At least one mole of amine should be used for each halogen atom in the compound having the formula $(RO)_nSiX_{4-n}$. In practice, the ratio of amine reactant to the reactant having the formula $(RO)_nSiX_{4-n}$ may vary between about one to one and about twelve to one, respectively.

Regardless of the method used, the desired reaction product is isolated by distilling off, under normal or reduced pressure, excess solvent, amine, thiol reactant and any unreacted $(RO)_nSiX_{4-n}$ reactant. The desired ester is recovered, in relatively pure form, as the residue from the distillation operation.

The following specific examples are for the purpose of exemplifying the esters of the present invention. It is to be clearly understood that the invention is not to be considered as limited to the specific $(RO)_nSiX_{4-n}$ and thiol reactants, or to the operations and manipulations described in the examples. As will be apparent to those skilled in the art, other reactants, as set forth hereinbefore, may be used to prepare a wide variety of products in accordance with this invention.

EXAMPLE III

Octoxytri(octylthio)silane

A solution of 58.4 grams of n-octanthiol in 200 cubic centimeters of benzene was refluxed with 9.2 grams of finely-divided sodium metal. After about five hours most of the metal had reacted, and a fine suspension of sodium octyl mercaptide was obtained. Then, 18 grams of octoxytrichlorosilane, dissolved in 100 cubic centimeters of benzene, were added dropwise to the suspension. After the addition (which took about ¾ hour) was complete, the reaction mixture was heated at reflux temperature (about 80° C.) for two hours. The reaction mixture was chilled in an ice bath and filtered to remove sodium chloride and unreacted sodium mercaptide. The filtrate was topped at a temperature of about 250° C. under about 30 millimeters pressure to remove benzene and unreacted materials. The residue was filtered through a thin layer of filtering clay yielding 29 grams of an amber-colored liquid. This represents a yield of 71.6 per cent, based on the weight of octoxytrichlorosilane charged. The physical data for this product appear in Table II.

EXAMPLE IV

Didodecoxydi(octylthio)silane

A solution of 32 grams of didodecoxydichlorosilane and 58.4 grams of n-octanthiol in 350 cubic centimeters of benzene was placed in a reaction vessel. To this solution were added 43 grams of triethylamine slowly with stirring. The reaction mixture was then held at reflux temperature (about 80° C.) for two hours. The resulting mixture was chilled in an ice bath, and filtered to remove triethylamine hydrochloride. The filtrate was topped at 300° C. under about 0.5 millimeter pressure to remove benzene and unreacted materials. The residue was filtered through a thin layer of filtering clay. The amber-colored product weighed 40 grams, giving a yield of 85.3 percent, based on the weight of the didodecoxydichlorosilane charged.

EXAMPLE V

Tri(dodecoxy)octylthiosilane

A reaction mixture consisting of 50 grams of tridodecoxychlorosilane, 43 grams of n-octanthiol, and 30 grams of triethylamine, dissolved in 300 cubic centimeters of benzene was heated at reflux temperature (about 80° C.) for about two hours. The mixture was chilled and the product was isolated in the same manner as used in Example IV. The oily product weighed 43 grams, representing a yield of 74 per cent, based on the weight of tridodecoxychlorosilane charged. Physical data for this compound are listed in Table II.

EXAMPLE VI

Diphenoxydi(octylthio)silane

A solution comprising 34 grams of diphenoxydichlorosilane and 73 grams of n-octanthiol in 350 cubic centimeters of xylene was placed in a reaction vessel and stirring was commenced. To this solution were added slowly 65 grams of triethylamine. When addition was complete, the reaction mixture was heated and held at reflux temperature (about 135° C.) for about three hours. The resultant reaction mixture was cooled to room temperature (about 20° C.) and filtered to remove the amine hydrochloride. The filtrate was subjected to distillation at 300° C. under 0.5 millimeter pressure to remove xylene and unreacted materials. The residue was filtered through a thin layer of filtering clay. It was an amber-colored oil having the properties shown in Table II. A yield of 53.3 percent, based on the weight of diphenoxydichlorosilane charged, was obtained.

EXAMPLE VII

Cyclohexanoxytri(octylthio)silane

To a stirred solution comprising 36 grams of cyclohexanoxytrichlorosilane and 80 grams of n-octanthiol in 300 cubic centimeters of xylene, were added slowly 50 grams of triethylamine. After addition was complete, the reaction mixture was heated at reflux temperature (about 135° C.) for about two hours. The reaction mixture was chilled in an ice bath and filtered to remove triethylamine hydrochloride. The filtrate was subjected to distillation at 300° C. under 0.5 millimeter pressure to remove xylene and unreacted materials. The residue was filtered through a thin layer of filtering clay. It was a viscous product amounting to a yield of 66 percent, based on the weight of cyclohexanoxytrichlorosilane charged. The physical properties of this product are listed in Table II.

The physical test data on the afore-described products, tested as lubricants, are shown in Table II.

TABLE II

| Example | Pour Point, °F. | Kinematic Viscosity Centistokes | | Viscosity Index |
|---|---|---|---|---|
| | | @100 °F. | @210 °F. | |
| III | −65 | 13.22 | 3.47 | 161 |
| IV | −20 | 12.99 | 3.69 | 191 |
| V | +15 | 16.16 | 4.42 | 199 |
| VI | −65 | 14.46 | 3.61 | 154 |
| VII | −65 | 24.84 | 5.06 | 144 |

It will be apparent that the products of the present invention are good synthetic lubricants having low pour points and high viscosity indices. The stability of synthetic lubricants of this type is illustrated by the data in Table III, obtained by comparing a sample of the product of Example III with an SAE 10 motor oil in a laboratory bench-scale oxidation test. The motor oil used for comparative purposes is an oil obtained from a paraffinic crude and has a kinematic viscosity of 40.5 cs. at 100° F. and 5.99 cs. at 210° F., a viscosity index of 100, a pour point of +5° F., and a neutralization number of 0.05.

TABLE III

| Sample | N. N.[1] | Viscosity Increase, Per cent | Tube Sludge | Lead Loss, mg. |
|---|---|---|---|---|
| Example III | 0.1 | 1.7 | None | 1.2 |
| SAE 10 Oil | 15.0 | 95.0 | do | 200.0 |

[1] Neutralization Number = mg. KOH required to neutralize 1 gram of oil sample.

In the test from which the data set forth in Table III were obtained, a 25-milliliter sample of test oil was placed in a test tube containing an oxidation catalyst comprising one square inch of iron and three square inches of copper, and lead piece having a surface area of 1/6 square inch. The tube was placed in a constant temperature bath at about 300° F. A gas delivery tube was inserted into the oil and dry air was passed through the oil at a rate of five liters per hour. After 40 hours, the tube was removed and examined for sludge. The sludging of the oil forms a criterion of the tendency of the lubricant to form insoluble substances, organic and inorganic. The lead piece, which had been carefully weighed prior to the test, was removed and carefully weighed. The loss in weight indicates the tendency of the lubricant to attack lead-containing bearing surfaces. The viscosity increase reveals the tendency of the lubricant toward polymerization. The neutralization number is a measure of the susceptibility of the lubricant to oxidize to acidic substances.

From the data set forth in Table III, it will be apparent that the synthetic lubricants of the present invention are superior to mineral lubricating oils. They are not susceptible to oxidation, there is little tendency toward polymerization, and, finally, there is very little attack on lead bearing surfaces.

In addition to their utility as synthetic lubricants, per se, the products of the present invention are, in general, completely soluble in mineral lubricating oils. Accordingly, they can be used as extenders for lubricants, or as additives to lubricating oils for the purpose of imparting desirable properties thereto.

Although the present invention has been described with preferred embodiments, it is to be understood that modifications and variations may be resorted to without departing from the spirit and scope of this invention, as those skilled in the art will readily understand. Such variations and modifications are considered to be within the purview and scope of the appended claims.

I claim:

1. A process for the production of compounds having the formula, $(RO)_nSi(SR')_{4-n}$, wherein $n$ is an integer varying between one and three, R is a radical selected from the group consisting of alkyl, cycloalkyl, and aryl radicals, and R' is a radical selected from the group consisting of alkyl, cycloalkyl, and aryl radicals; which comprises reacting a compound having the formula, $(RO)_nSiX_{4-n}$, wherein $n$ is an integer varying between one and three, R is a radical selected from the group consisting of alkyl, cycloalkyl, and aryl radicals, and X is a halogen; with a reactant selected from the group consisting of (1) a compound having the formula, R'SH, wherein R' is a radical selected from the group consisting of alkyl, cycloalkyl, and aryl radicals, and a trialkylamine in amounts equivalent to at least one mole for each halogen atom present in each mole of said compound having the formula, $(RO)_nSiX_{4-n}$, and (2) a compound having the formula, R'SNa, wherein R' is a radical selected from the group consisting of alkyl, cycloalkyl, and aryl radicals; in amounts equivalent to an excess over that required to react with all of the halogen atoms of said compound having the formula $(RO)_nSiX_{4-n}$.

2. A process for the production of compounds having the formula, $(RO)_nSi(SR')_{4-n}$, wherein $n$ is an integer varying between one and three, R is an alkyl radical, and R' is a radical selected from the group consisting of alkyl, cycloalkyl, and aryl radicals, which comprises reacting a compound having the formula, $(RO)_nSiX_{4-n}$, wherein $n$ is an integer varying between one and three, R is an alkyl radical, and X is chlorine, with a compound having the formula, R'SNa, wherein R' is a radical selected from the group consisting of alkyl, cycloalkyl, and aryl radicals, in amounts equivalent to an excess over that required to react with all the chlorine atoms of said compound having the formula, $(RO)_nSiX_{4-n}$, at a temperature varying between about 80° C. and about 140° C.

3. A process for the production of compounds having the formula, $(RO)_nSi(SR')_{4-n}$, wherein $n$ is an integer varying between one and three, R is a radical selected from the group consisting of alkyl, cycloalkyl, and aryl radicals, and R' is a radical selected from the group consisting of alkyl, cycloalkyl, and aryl radicals, which comprises reacting a compound having the formula, $(RO)_nSiX_{4-n}$, wherein $n$ is an integer varying between one and three, R is a radical selected from the group consisting of alkyl, cycloalkyl, and aryl radicals, and X is a halogen, with a compound having the formula, R'SH, wherein R' is a radical selected from the group consisting of alkyl, cycloalkyl, and aryl radicals, in amounts equivalent to an excess over that required to react with all the halogen atoms of said compound having the formula, $(RO)_nSiX_{4-n}$, at a temperature varying between about 80° C. and about 140° C., and in the presence of a trialkylamine in amounts equivalent to at least one mol for each halogen atom present in each mol of said compound having the formula, $(RO)_nSiX_{4-n}$.

4. A process for the production of compounds having the formula, $(RO)_nSi(SR')_{4-n}$, wherein $n$ is an integer varying between one and three, R is an alkyl radical, and R' is a radical selected from the group consisting of alkyl, cycloalkyl, and aryl radicals, which comprises reacting a compound having the formula, R'SH, wherein R' is a radical selected from the group consisting of alkyl, cycloalkyl, and aryl radicals, with a compound having the formula, $(RO)_nSiCl_{4-n}$, wherein $n$ is an integer varying between one and three, and R is an alkyl radical, and in the presence of a trialkylamine; said compound having the formula, R'SH, being used in amounts equivalent to an excess over that required to react with all of the chlorine atoms of said compound having the formula, $(RO)_nSiCl_{4-n}$, and said trialkylamine being used in amounts equivalent to at least one mole for each chlorine atom present in each mole of said compound having the formula, $(RO)_nSiCl_{4-n}$.

5. A process for the production of compounds having the formula, $(RO)_nSi(SR')_{4-n}$, wherein $n$ is an integer varying between one and three, R is a cycloalkyl radical, and R' is a radical selected from the group consisting of alkyl, cycloalkyl, and aryl radicals, which comprises reacting a compound having the formula, $(RO)_nSiX_{4-n}$, wherein $n$ is an integer varying between one and three, R is a cycloalkyl radical, and X is chlorine, with a compound having the formula, R'SH, wherein R' is a radical selected from the group consisting of alkyl, cycloalkyl, and aryl radicals, in amounts equivalent to an excess over that required to react with all the chlorine atoms of said compound having the formula, $(RO)_nSiX_{4-n}$, at a temperature varying between about 80° C. and about 140° C., and in the presence of a trialkylamine in amounts equivalent to at least one mol for each chlorine atom present in each mol of said compound having the formula, $$(RO)_nSiX_{4-n}$$

6. A process for the production of compounds having the formula, $(RO)_nSi(SR')_{4-n}$, wherein $n$ is an integer varying between one and three, R is an aryl radical, and R' is a radical selected from the group consisting of alkyl, cycloalkyl, and aryl radicals, which comprises reacting a compound having the formula, $(RO)_nSiX_{4-n}$, wherein $n$ is an integer varying between one and three, R is an aryl radical, and X is chlorine, with a compound having the formula, R'SH, wherein R' is a radical selected from the group consisting of alkyl, cycloalkyl, and aryl radicals, in amounts equivalent to an excess over that required to react with all the chlorine atoms of said compound having the formula, $(RO)_nSiX_{4-n}$, at a temperature varying between about 80° C. and about 140° C., and in the presence of a trialkylamine in amounts equivalent to at least one mol for each chlorine atom present in each mol of said compound having the formula, $(RO)_nSiX_{4-n}$.

7. A process for the production of octoxytri(octylthio)silane, which comprises reacting sodium n-octylmercaptide with octoxytrichlorosilane, at a temperature varying between about 80° C. and about 140° C., said sodium n-octylmercaptide being used in amounts equivalent to an excess over that required to react with all the chlorine atoms of said octoxytrichlorosilane.

8. A process for the production of didodecoxydi(octylthio)silane, which comprises reacting n-octanthiol with didodecoxydichlorosilane, in the presence of triethylamine; said n-octanthiol being used in amounts equivalent to an excess over that required to react with all of the chlorine atoms of said didodecoxydichlorosilane, and said triethylamine being used in amounts equivalent to at least one mole for each chlorine atom present in each mole of said didodecoxydichlorosilane.

9. A process for the production of cyclohexanoxytri(octylthio)silane, which comprises reacting n-octanthiol with cyclohexanoxytrichlorosilane, at a temperature varying between about 80° C. and about 140° C., and in the presence of triethylamine; said n-octanthiol being used in amounts equivalent to an excess over that required to react with all the chlorine atoms of said cyclohexanoxytrichlorosilane, and said triethylamine being used in amounts equivalent to at least one mole for each chlorine atom present in each mole of said cyclohexanoxytrichlorosilane.

10. A process for the production of diphenoxydi(octylthio)silane, which comprises reacting n-octanthiol with diphenoxydichlorosilane, at a temperature varying between about 80° C. and about 140° C., and in the presence of triethylamine; said n-octanthiol being used in amounts equivalent to an excess over that required to react with all the chlorine atoms of said diphenoxydichlorosilane, and said triethylamine being used in amounts equivalent to at least one mole for each chlorine atom present in each mole of said diphenoxydichlorosilane.

11. A compound having the formula, $$(RO)_nSi(SR')_{4-n}$$

wherein $n$ is an integer varying between one and three, R is a radical selected from the group consisting of alkyl, cycloalkyl, and aryl radicals, and R' is a radical selected from the group consisting of alkyl, cycloalkyl and aryl radicals, and containing between about 30 carbon atoms and about 44 carbon atoms per molecule.

12. A compound having the formula, $$(RO)_nSi(SR')_{4-n}$$

wherein $n$ is an integer varying between one and three, R is an alkyl radical, and R' is an alkyl radical and containing between about 30 carbon atoms and about 44 carbon atoms per molecule.

13. A compound having the formula, $$(RO)_nSi(SR')_{4-n}$$

wherein $n$ is an integer varying between one and three, R is a cycloalkyl radical, and R' is an alkyl radical, and containing between about 30 carbon atoms and about 44 carbon atoms per molecule.

14. A compound having the formula, $$(RO)_nSi(SR')_{4-n}$$

wherein $n$ is an integer varying between one and three, R is an aryl radical, and R' is an alkyl radical, and containing between about 30 carbon atoms and about 44 carbon atoms per molecule.

15. Octoxytri(octylthio)silane.
16. Didodecoxydi(octylthio)silane.
17. Cyclohexanoxytri(octylthio)silane.
18. Diphenoxydi(octylthio)silane.

BERNARD A. ORKIN.

REFERENCES CITED

The following references are of record in the file of this patent:

Backer et al.: "Rec. Trav. Chim.," vol 61 (1942), pages 500–512.